United States Patent
Schmitz et al.

(10) Patent No.: US 9,917,514 B2
(45) Date of Patent: Mar. 13, 2018

(54) NON PWM DIGITAL DC-DC CONVERTER

(71) Applicant: IDT EUROPE GMBH, Dresden (DE)

(72) Inventors: Richard Maria Schmitz, San Tan Valley, AZ (US); Eric Marschalkowski, Inning am Ammersee (DE); Chris Young, Round Rock, TX (US)

(73) Assignee: IDT EUROPE GMBH, Dresden (DE)

( * ) Notice: Subject to any disclaimer, the term of this patent is extended or adjusted under 35 U.S.C. 154(b) by 0 days.

(21) Appl. No.: 14/889,204

(22) PCT Filed: May 23, 2014

(86) PCT No.: PCT/EP2014/060657
§ 371 (c)(1),
(2) Date: Nov. 5, 2015

(87) PCT Pub. No.: WO2014/187953
PCT Pub. Date: Nov. 27, 2014

(65) Prior Publication Data
US 2016/0094129 A1    Mar. 31, 2016

Related U.S. Application Data

(60) Provisional application No. 61/827,222, filed on May 24, 2013.

(51) Int. Cl.
*H02M 3/157* (2006.01)
*H02M 3/158* (2006.01)
*H02M 1/00* (2006.01)

(52) U.S. Cl.
CPC .... *H02M 3/158* (2013.01); *H02M 2001/0035* (2013.01); *Y02B 70/16* (2013.01)

(58) Field of Classification Search
CPC . H02M 2001/0012; H02M 2001/0025; H02M 2003/1566; H02M 3/156; H02M 3/157
See application file for complete search history.

(56) References Cited

U.S. PATENT DOCUMENTS 5,677,618 A  * 10/1997  Fiez ............... H02M 3/156
                                                  323/282
7,061,213 B2 * 6/2006  Yoshida .......... H02M 3/156
                                                  323/224

(Continued)

FOREIGN PATENT DOCUMENTS

TW    201230681 A    7/2012
TW    201505347 A    2/2015

OTHER PUBLICATIONS

International Search Report for PCT/EP2014/060657 dated Aug. 12, 2014.

*Primary Examiner* — Gary L Laxton
(74) *Attorney, Agent, or Firm* — Heslin Rothenberg Farley & Mesiti P.C.

(57) ABSTRACT

A switched power converter includes a power stage for generating an output voltage according to a switching signal and an input voltage via a switching element. The switching signal is generated by a variable timing generator which is controlled by a compensator. The pulses of the switching signal are generated on a "need to have basis". Hence, theses pulses may be generated independently of a PWM period. The pulses can be generated such that switching losses are minimized. A switching pattern can be matched to the load current pattern. Thus, the behavior of the compensator can be synchronized to a regular pattern of the load current. A high resolution variable timing generator may be employed.

12 Claims, 2 Drawing Sheets

(56) References Cited

U.S. PATENT DOCUMENTS

| | | | |
|---|---|---|---|
| 7,323,855 B2 * | 1/2008 | Xiao | H02M 3/33515 |
| | | | 323/283 |
| 7,629,782 B2 * | 12/2009 | Naka | H02M 3/157 |
| | | | 323/271 |
| 7,667,446 B2 * | 2/2010 | Williams | G05F 5/00 |
| | | | 323/283 |
| 7,956,592 B2 * | 6/2011 | Morroni | H02M 3/157 |
| | | | 323/283 |
| 2012/0139512 A1 | 6/2012 | Usui | |

* cited by examiner

NON PWM DIGITAL DC-DC CONVERTER

CROSS REFERENCE TO RELATED APPLICATIONS

This application is a national stage filing under section 371 of International Application No. PCT/EP2014/060657, filed on May 23, 2014, and published in English on Nov. 27, 2014, as WO 2014/187953 A1, which claims priority of U.S. Provisional Application No. 61/827,222 filed on May 24, 2013, the entire content of said applications being hereby incorporated herein by reference.

FIELD OF THE INVENTION

The present disclosure relates to a switched power converter controlled on a none pulse width modulation (PWM) basis and related method.

BACKGROUND OF THE INVENTION

Switched DC-DC converters comprise a switchable power stage, wherein an output voltage is generated according to a switching signal and an input voltage. The switching signal is generated in a digital control circuit that adjusts the output voltage to a reference voltage. The switched power stage comprises a dual switch consisting of a high-side field effect transistor (FET) and a low-side FET, an inductance and a capacitor. During a charge phase, the high-side FET is turned on by the switching signal to charge the capacitor. During a discharge phase the high-side FET is turned off to drain the capacitor. The switching signal is generated as a digital pulse width modulation signal with a duty cycle determined by a control law. The control law may be implemented by a PID compensator generating a PWM signal.

PWM is recommended for applications that require a fixed frequency or in case certain frequencies need to be avoided. This can be the case in a system like data acquisition, mobile phones, etc. However, when a load current exhibits a regular pattern, PWM based control may lead to avoidable switching losses. Hence, what is needed is a solution that saves energy.

Disclosure of the Invention

This solution is achieved with a power converter according to the independent apparatus claim and a method for controlling a switched power converter according to the independent method claim. Dependent claims relate to further aspects of the present invention.

The present invention relates to switched power converter comprising a power stage for generating an output voltage according to a switching signal and an input voltage by means of a switching element. The switching signal is generated by a variable timing generator which is controlled by a compensator. The pulses of the switching signal are generated on a "need to have basis". Hence, theses pulses may be generated independently of a PWM period. The pulses can be generated such that switching losses are minimized. A switching pattern can be matched to the load current pattern. Thus, the behavior of the compensator can be synchronized to a regular pattern of the load current. A high resolution variable timing generator may be employed.

The present disclosure further relates to a method for controlling a switched power converter. The method comprises generating an output voltage according to a switching signal and an input voltage by means of switching element driven by a variable timing generator; and controlling the variable timing generator using a compensator to generate pulses of the switching signal on an on-demand basis.

BRIEF DESCRIPTION OF THE DRAWINGS

Reference will be made to the accompanying drawings, wherein.

DETAILED DESCRIPTION OF THE INVENTION

Figure 1:
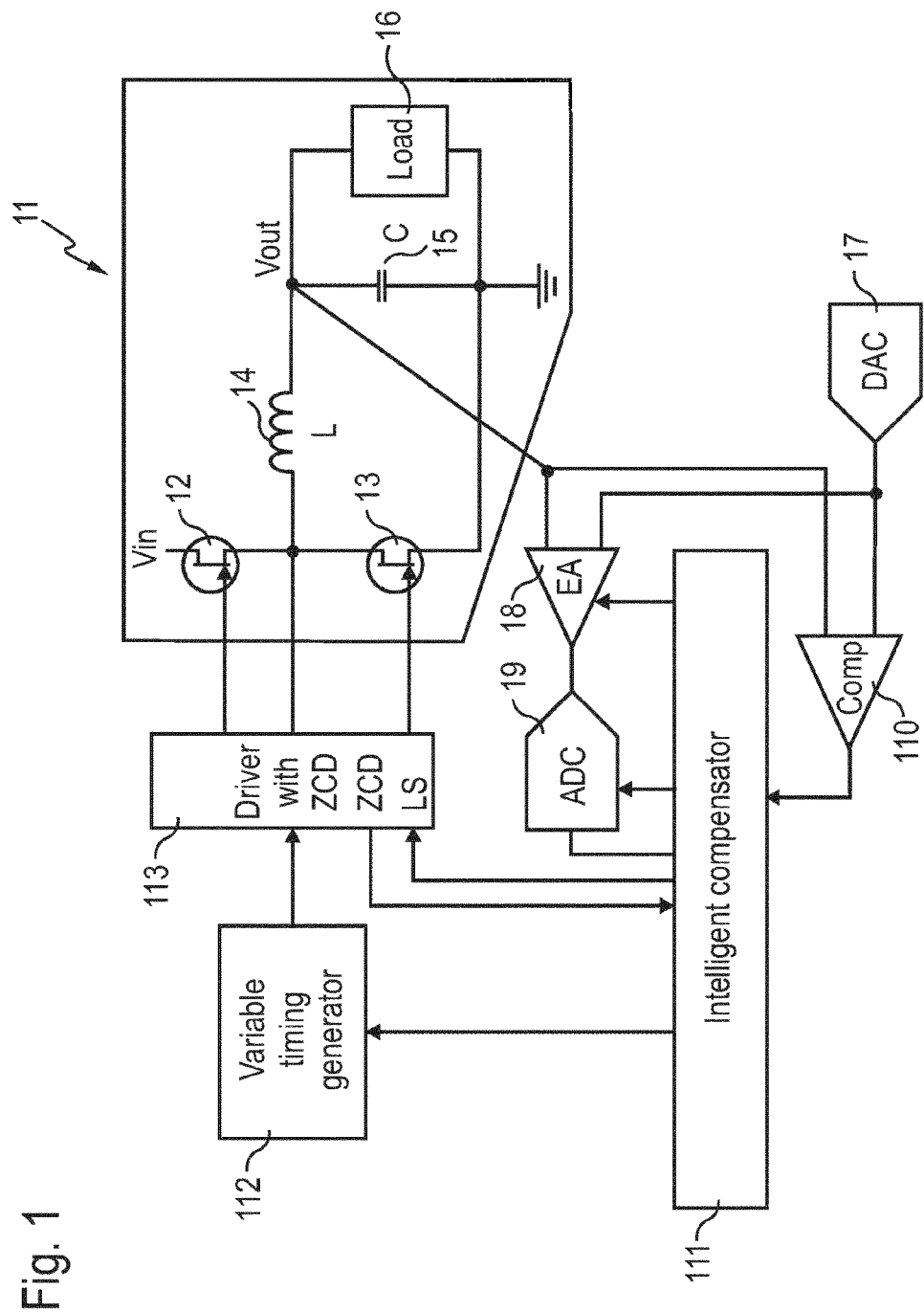
FIG. 1 shows a block diagram of DC-DC converter with an intelligent compensator on a non-PWM basis.

FIG. 1 shows a power converter comprising a power stage 11. The power stage 11 comprises a first switching element 12 and a second switching element 13, an inductance 14, a capacitor 15 and a load 16. The switching elements 12 and 13 are driven by a driver 113 with zero current detection. The driver 113 forwards a switching signal generated by variable timing generator 112 that is controlled by an intelligent compensator 111 on a non-PWM basis. The intelligent compensator 111 compensator controls the variable timing generator such that pulses of the switching signal are generated on a need to have basis. For this purpose, the intelligent compensator processes an error signal generated by error amplifier 18 and being digitized by ADC 19. Error amplifier 18 and ADC can be adjusted by the intelligent compensator 111. The error signal is the difference between the output voltage of the power stage 11 and a reference voltage converted to the analog domain by DAC 17. Furthermore, the power converter comprises a comparator 110 that generates a signal for the intelligent compensator 111 for detecting load transients.

Figure 2:
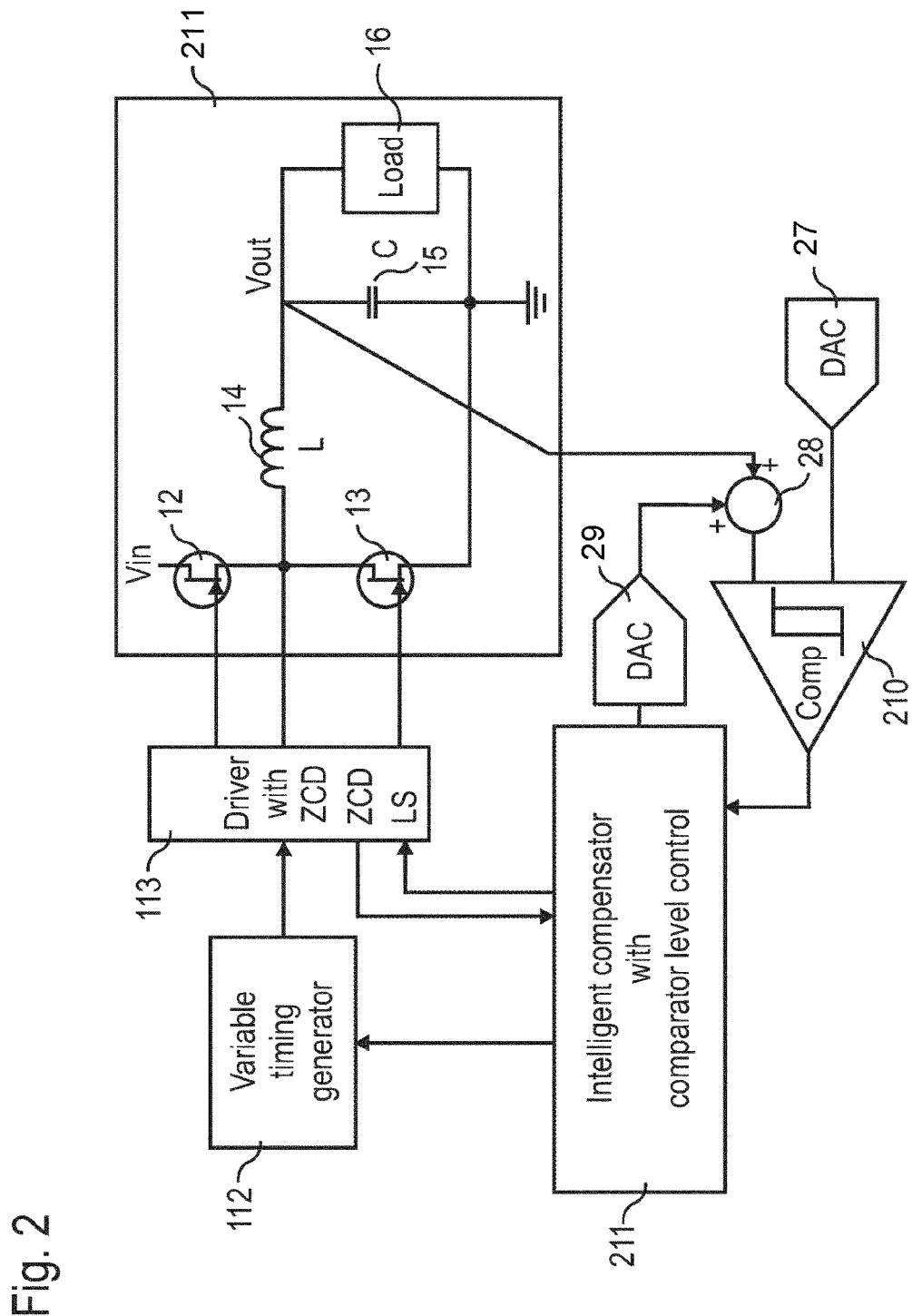
FIG. 2 shows a block diagram of DC-DC converter with an intelligent compensator with comparator level control.

FIG. 2 shows another embodiment in which a hysteretic control loop comprising a hysteretic comparator 210 is provided. The hysteretic comparator 210 compares the output voltage of the power stage 211 with a reference voltage being transformed to the analog domain by DAC 27.

The hysteretic behavior of the hysteretic comparator 210 may be adjusted by the intelligent compensator with hysteretic control 211. The intelligent compensator with hysteretic control generates a voltage offset that is transformed to the analog domain by DAC 29 and added to the output voltage by adder 28.

The invention claimed is:
1. A switched power converter comprising a power stage including a dual switch connected between a first supply voltage and a second supply voltage consisting of a high-side first switching element and a low-side second switching element,
an inductance connected with one end to a connection between the first switching element and the second switching element and with a second end to a capacitor of the power stage for generating an output voltage of the power stage between the second end of the inductance and the second supply voltage according to a switching signal and an input voltage via the dual switch, the switching signal being generated by a variable timing generator that is controlled by a compensator to generate pulses of the switching signal on a non pulse width modulation on-demand basis, and the compensator being controlled by feedback of the output voltage of the power stage, and a high resolution windowed analog-to-digital converter for sampling the output voltage, wherein the compensator is configured to process an error signal generated by an error amplifier that computes and amplifies a difference between the output voltage of the power stage and a reference voltage, wherein the error signal is digitized by the analog-to-digital converter.

2. The switched power converter according to claim 1, wherein the compensator is configured to control the variable timing generator to generate pulses of the switching signal such that switching losses are minimized.

3. The switched power converter according to claim 1, wherein the compensator is configured to control the variable timing generator to generate pulses of the switching signal on a non pulse width modulation basis independently of a pulse width modulation period.

4. The switched power converter according to claim 1, wherein the compensator is configured to control the variable timing generator to generate pulses of the switching signal such that a resulting pattern of the pulses matches a pattern of a load current.

5. The switched power converter according to claim 1, further comprising a comparator configured to compare the output voltage of the power stage with the reference voltage to generate a signal processed by the compensator for detecting load transients.

6. The switched power converter according to claim 1, comprising a hysteretic control loop formed by a hysteretic comparator and the compensator wherein the hysteretic comparator is configured to compare the output voltage of the power stage with a reference voltage for driving the compensator.

7. The switched power converter according to claim 6, wherein a hysteretic behavior of the hysteretic comparator is adjustable by the compensator.

8. The switched power converter according to claim 7, wherein the compensator is configured to generate a voltage offset that is transformed to the analog domain by a digital to analog converter and added to the output voltage by an adder to adjust the hysteretic behavior of the hysteretic comparator.

9. A method for controlling a switched power converter, the method comprising:
  generating an output voltage according to a switching signal and an input signal via a dual switch connected between a first supply voltage and a second supply voltage consisting of a high-side first switching element and a low-side second switching element, an inductance connected with one end to a connection between the first switching element and the second switching element, and with a second end to a capacitor of the power stage, driven by a variable timing generator;
  controlling the variable timing generator using a compensator to generate pulses of the switching signal on a non pulse width modulation on-demand basis controlled by a feedback of the output voltage of the power stage;
  processing an error signal that is a difference between the output voltage and a reference voltage by the compensator; and
  processing a signal that is a comparison between the output voltage and a reference voltage by the compensator to detect load transients.

10. The method according to claim 9, comprising:
  controlling the variable timing generator using the compensator to generate pulses of the switching signal such that switching losses are minimized.

11. The method according to claim 9, comprising:
  controlling the variable timing generator using the compensator to generate pulses of the switching signal on a non pulse width modulation basis independently of a pulse width modulation period.

12. The method according to claim 9, comprising:
  generating the switching signal using a hysteretic control loop comprising a comparator and a hysteretic compensator wherein the hysteretic comparator is configured to compare the output voltage of the power stage with a reference voltage for driving the compensator.

* * * * *